June 13, 1967 J. RABINOW ETAL 3,325,603

STEREO RECORD PLAYER USING OPTICAL MEANS SEPARATE FROM THE TONE ARM

Filed Feb. 20, 1963 2 Sheets-Sheet 1

INVENTORS
Jacob Rabinow
William Fischer

BY Joseph A. Genovese & Max L. Libman

ATTORNEYS

INVENTORS
Jacob Rabinow
William Fischer

BY Joseph A. Genovese &
Max L. Libman

ATTORNEYS

United States Patent Office 3,325,603

Patented June 13, 1967

3,325,603

STEREO RECORD PLAYER USING OPTICAL MEANS SEPARATE FROM THE TONE ARM

Jacob Rabinow, 6920 Selkirk Drive, Bethesda, Md. 20034, and William Fischer, Silver Spring, Md., assignors, by mesne assignments, to Jacob Rabinow, Bethesda, Md Filed Feb. 20, 1963, Ser. No. 259,886
5 Claims. (Cl. 179—100.41)

This invention relates to record players, especially to stereo record players.

The advantages of low stylus-to-groove pressure are well known. Among others, the records are played with low surface noise, produce less distortion, and last longer. This applies to all conventional records regardless of whether they are lateral cut, hill and dale, or stereo.

An object of this invention is to provide a record player pick-up system which enables the stylus to track a record groove with less stylus-to-groove pressure than is possible with conventional tone arm-supported pick-up devices.

This is accomplished by physically separating the transducer element from the stylus, and by using a light sensitive transducer rather than a transducer which is supported by the tone arm and excited by mechanical motions of the stylus. In this manner we do not have a mechanical coupling between the stylus and transducer, and all supported by the tone arm which has its own problems of resonance, vibration, etc. Instead, we have an arm supporting the stylus (but not the transducer element) whereby the stylus-to-arm coupling can be directly and more effectively damped. As a result, our support arm is not excited as much as a conventional arm and can support the stylus in such a manner that it tracks the record groove with a very small force.

The above applies to monaural and stereo record tracking, however, our invention provides additional advantages in stereo systems. In stereo records the audio information must be extracted from separate information channels in a single groove which is cut in a manner such that the sides ("channels") of the groove are at an angle of approximately ninety degrees to each other. Separate audio signals are derived from stylus excursions along lines parallel to the two groove walls. Thus, when a transducer is excited by a single stylus tracking the groove, it is very difficult to isolate the excursions parallel to one wall (i.e., audio from one channel) from excursions parallel to the other wall (audio from the other channel). This is true regardless of the type of pick up which is used. A single-piece ceramic pick up as in U.S. Patent No. 3,053,034 admittedly has cross talk problems, while the more common pick-up devices with mutually perpendicular coils, piezoelectric crystals, polarized ceramic wafers, etc., have cross talk difficulties originating from the mechanical coupling between the stylus and the pair of coils, crystals, etc.

Another object of the invention is to provide a stereo pick-up system where cross talk originating from these and similar sources, is minimized.

In a typical embodiment of the invention we have a light reflective stylus with two groove-tracking edges and two light-valving edges parallel to the sides (channels) of the record groove as the stylus tracks the groove. The reflective stylus is illuminated, and an image of the stylus is formed on a mask which has two optical apertures, e.g. slots, perpendicular to the valving edges thereby being parallel to the respective record groove channels with which they are associated. By using a pair of photocells and conventional circuits to respond to the light passing through the slots, our system reproduces the information recorded in the separate channels.

The light valving of the stylus-mask-photocell arrangement operates as follows: as the stylus moves in a direction parallel to one wall of the groove, the image of the stylus moves in a manner that one aperture is illuminated an amount proportional to the stylus motion. Due to the geometrical relationship described before, the other aperture is unaffected because its associated image edge moves perpendicular to the longitudinal axis of the aperture. In a like manner, stylus motion parallel to the other wall of the groove will affect only its associated mask aperture, with the very important feature that the other aperture is not affected. Thus, cross talk is eliminated or greatly minimized.

U.S. Patents Nos. 1,891,227; 1,916,973; 1,917,003 and 1,967,882 evidence prior efforts to play records by means of light transducers. Apart from the fact that these patents do not deal with stereo and the problems peculiar thereto, each patentee uses light reflected directly from the groove. There are inherent difficulties in imaging a record groove and extracting information from the image, or using direct reflections from the groove, or one wall thereof which is even more onerous. Some of the difficulties are that conventional record grooves are very close and it is easy for the light system to skip grooves. Also, the lands and upper edges of the groove are rough (as inspected with the aid of magnification). The rough edges disperse the light causing noise in the system. A. O. Morse and J. Rabinow experienced these and other problems in their work on optical record players, some of which is described in application No. 115,253, now U.S. Patent No. 3,138,669.

The record players described in the Rabinow-Morse application work, but they are comparatively expensive due, in part, to the scanner and associated circuits. Our invention forgoes the advantage of not touching the record which is discussed in the Rabinow-Morse application, but obtains other advantages, as light stylus pressure and cross talk elimination in a stereo system, without relying upon highly complex amplifiers or other means.

Accordingly, another object of the invention is to provide a comparatively simple stereo record playing system using a light-energy coupling between a stylus and photosensitive transducer.

Other objects and features will become apparent in following the description of the illustrated forms of our invention.

Figure 6:
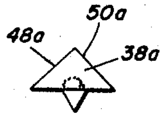
FIGURE 6 is a view taken on the line 6—6 of FIGURE 5.
Figure 6A:
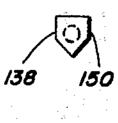
Figure 6B:
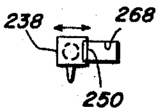

FIGURES 6*a* and 6*b* are front views of styli designed for tracking the grooves of monaural records.

Figure 7:
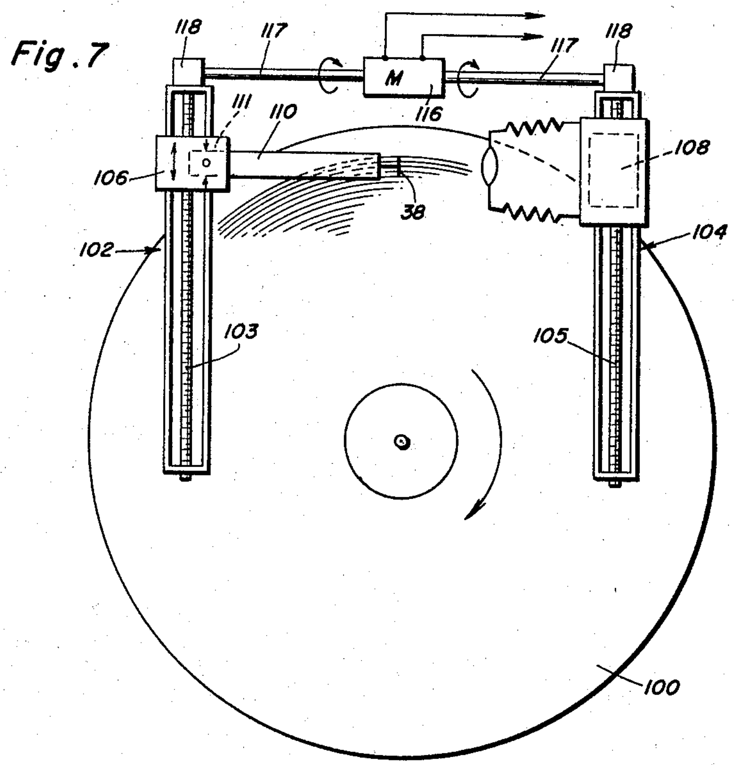

FIGURE 7 is a largely diagrammic plan view of a straight line motion modification.

Figure 8:
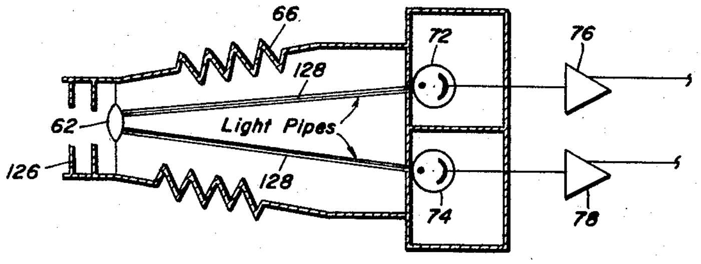

FIGURE 8 is another modification showing the use of light pipes in the optical system.

Figure 1:
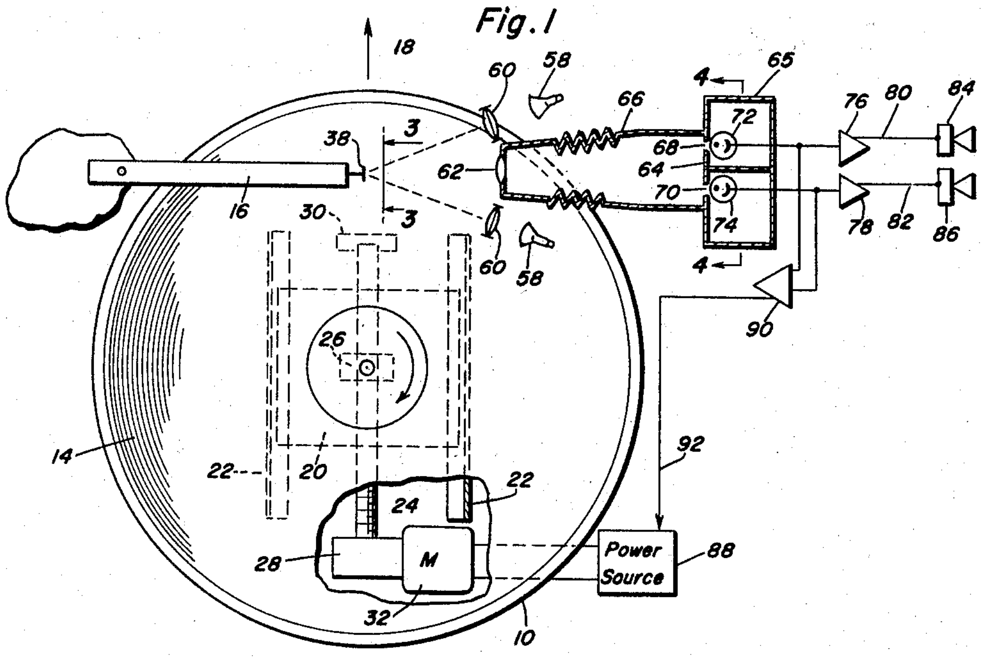
FIGURE 1 is a partially schematic top view of one form of the invention.

FIGURE 1 shows a record player designed for stereo records, although record players in accordance with the invention can play monaural records (FIGURES 6*a* and 6*b*) just as monaural records can be played on conventional stereo record players. In the embodiment of FIGURE 1 turntable 10 is rotated by motor 12 (FIGURE 2) and is adapted to support record 14. Instead of requiring stylus support arm 16 to move from the outer part of the record groove to the inner part as the stylus tracks the record groove, the entire turntable can be moved rectilinearly in the direction of arrow 18 (FIGURE 1) in a manner very similar to the displacement of the turntable in the Rabinow-Morse application. Thus, motor 12 is attached to a slide 20 (FIGURES 1 and 2) which is constrained by stationary ways 22. Screw 24 is threaded through nut 26 attached to slide 20 and is connected at one end to a gear reducer 28. The other end of screw 24 is supported by a stationary bearing 30. Gear reducer 28 is operated by motor 32, the latter being energized in a manner substantially identical to that described in the Rabinow-Morse application and discussed in more detail later.

Support arm 16 has the appearance of an ordinary tone arm of a conventional record player, but it is not a tone arm in the sense that a tone arm supports a mechanical-motion excited transducer. Our support arm 16 is mounted on a conventional pivot, gimbal, etc., which is represented as post 36 (FIGURE 2) near the balance point of the arm. Counterweight 37 is adjustably secured to the tone arm and can be of the vibration-damping type as disclosed in the Rabinow prior Patent 3,031,196 which has particular merit for stero records where oscillations in a direction at an angle to the plane of the record are as important to suppress as oscillations parallel to the plane of a monaural record.

Arm 16 supports stylus 38 to track the groove of typical record 14. In the illustrated embodiments, the stylus has a light reflective front surface and a light weight, thin rod 40 (or the equivalent) attached to its back surface. Rod 40 extends through a compliant damper 42, and is secured to arm 16 by clamp 41. Damper 42 can be made of a block of rubber attached to arm 16, and it functions to damp rod 40. Stylus 38 is attached to rod 40 in any suitable manner, for instance by being welded, cemented or of integral construction. In using stylus 38, support arm 16 is balanced so that the stylus very lightly contacts the walls of the record groove. For the reasons discussed before, the contact pressure can be considerably lower than stylus-to-groove pressures required of a conventional pick up.

Figures 2, 3, 4:
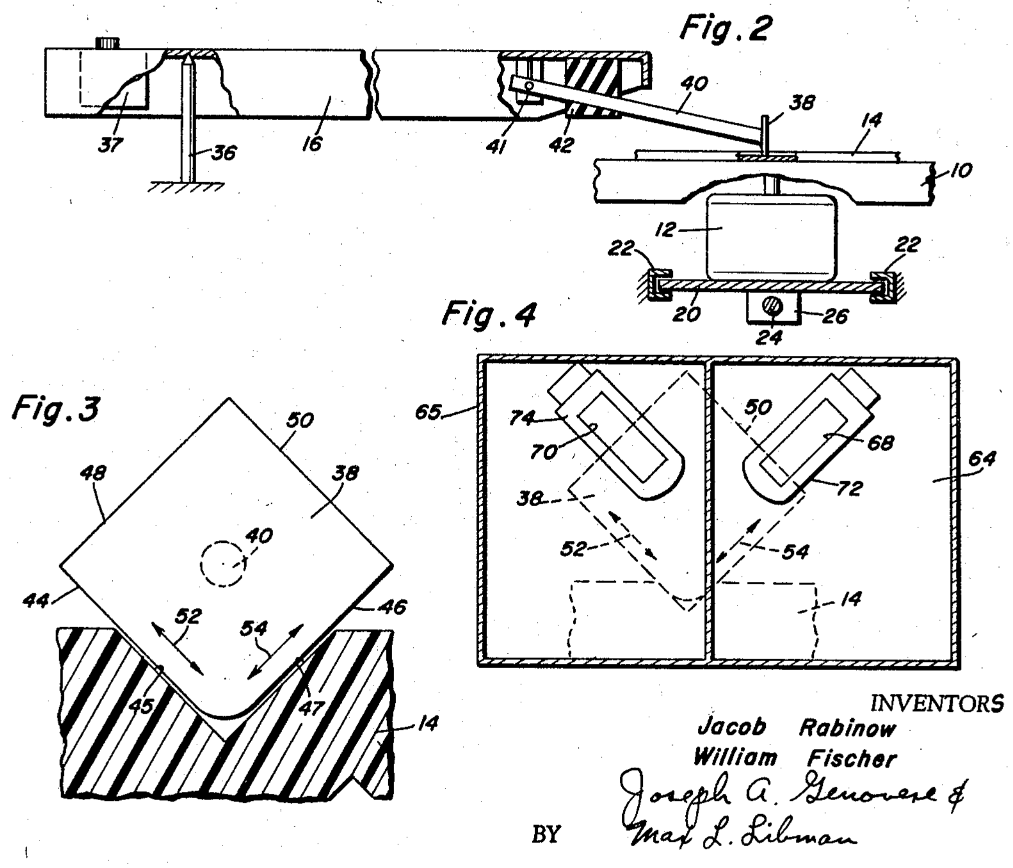
FIGURE 2 is an enlarged partly sectional view of the turntable and stylus with its support.
FIGURE 3 is an enlarged sectional view taken on the line 3—3 of FIGURE 1.
FIGURE 4 is an enlarged sectional view taken on the line 4—4 of FIGURE 1.

FIGURE 3 shows a greatly enlarged fragmentary section of a stereo record groove with stylus 38 located therein. In addition to the requirement that the stylus have a reflective surface, the stylus has a pair of groove-tracking edges 44, 46 at right angles to each other. These engage the sides 45, 47 of the record groove which form the two separate channels of audio information of the groove. The two upper edges 48, 50 of the stylus are at right angles to each other and parallel to their respective opposite edges 46, 44. Thus, from the front (FIGURE 3) stylus 38 is substantially square (lower corner rounded off) although this is not essential as will be described later in connection with the embodiment of FIGURES 5 and 6. As stylus 38 tracks the record groove it makes excursions along the directions of arrows 52 and 54, and these excursions ultimately provide the separate audio signals for the separate channels of the stero recording reproduction. The stylus excursions or movements in directions 52, 54 are the same as in a conventional stereo record player. One of the differences is that our rod 40 is merely the physical support for the stylus and is not a transmitter of mechanical motions to a pick up device for transducing the motions along lines 52, 54 to electrical signals. As described below, the optical image of stylus 38 and particularly edges 48 and 50 are used to detect the stylus excursions along lines 52, 54. This is accomplished as follows:

The front surface of the stylus 38 is illuminated (FIGURE 1) for instance by lamps 58 and suitably positioned condensing lenses 60. Lens 62 is in optical alignment with stylus 38 and forms an image thereof on the front face of mask 64 (FIGURE 4) located at the inner end of a light tight casing 66. The image (FIGURE 4) would be inverted, but is illustrated as shown for clarity. Mask 64 is the front wall of a subdivided casing 65 which has photocells 72, 74 (described later) in the respective compartments thereof. The mask has two optical apertures (slots or transparent windows) at right angles to each other. The longitudinal axis of slot 68 is perpendicular to the edge 50 of the image of stylus 38, and the axis of slot 70 is perpendicular to edge 48. Thus, if the axes of slots 68 and 70 were extended they would be normal to the respective stylus edges 44, 46 which track sides 45, 47 of the record groove. It is evident that as the stylus moves in its usual excursions while tracking the record groove, the bright image thereof covers (or uncovers) the slots directly proportionately to the lengths of the excursions along the paths 52, 54 of FIGURES 3 and 4. There is no cross talk betwen channels for the following reasons (see FIGURE 4). As the stylus image moves in its excursions in the direction indicated by arrow 52, slot 70 will proportionately be covered or uncovered by the stylus image, but edge 50 of the stylus moves perpendicular to the longitudinal axis of slot 68 and does not increase or decrease the exposure of slot 68 to the image of the stylus. In a like manner, motion of the stylus in the direction along arrow 54 will control the amount of light passing through slot 68 but will not affect the amount of exposure of slot 70 to the image of the stylus. Obviously, a number of modifications pertaining to this part of the invention become apparent. The slots can have independently adjustable iris-like slides parallel to the longer sides of the slots as a method of gain control and channel-balance. Further, the slots can be made triangular or trapezoidal with straight or curved longer sides in order to produce non-linear or special composition effects. Furthermore, we have described a light-reflection system where the stylus is reflective. This is the easier method of implementation of the invention. We can use the stylus as a shadow mask so that the image shown in dotted lines in FIGURE 4 will appear dark whereas the image background (area surrounding the image) is bright. This would mean positioning the light source behind the stylus instead of in front of it, for example on or beneath support arm 16.

We have photocells, for example photomultipliers 72 and 74, behind optical apertures 68, 70 of mask 64 and in the otherwise light-tight casing 65, to enable them to respond to the light flux passing through the optical apertures. The output signals from photocells 72 and 74 provide the audio signals for the separate channel circuits of the stereo record player. The circuits are schematically shown as amplifiers 76, 78 whose inputs from the photocells are conducted on lines 80, 82. The amplifier output lines conduct audio signals to separate speakers or speaker systems 84, 86.

As discussed in the Rabinow-Morse application, the turntable-displacing motor 32 can be operated from a power source 88 with servo signals on line 92 impressed on the motor or power supply to servo the operation of motor 32 and assure that the stylus will correctly track the record groove. As more fully described in the pending application, one way of providing the servo signal is to use a differential amplifier 90 whose separate inputs are derived from the outputs of the photocells whereby the differential amplifier responds to the difference in output signals. Amplifier 90 integrates with a comparatively long time constant with the result that the servo signal on line 92 from amplifier 90 follows the average DC level of the spiral groove (the pitch of the groove) while substantially ignoring the signal or audio modulations. The time constant for integration must be selected with engineering judgement. For example if it could be assumed that records have no eccentricity, the time constant can be long. But often records are eccentric, and therefore the time constant must be selected to follow the eccentirc groove, but ignore the audio.

Figure 5:
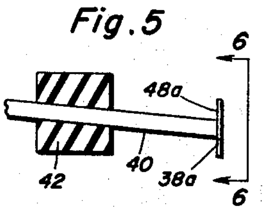
FIGURE 5 is a side view of a modification.

FIGURES 5 and 6 show a modification of the stylus. In these figures the stylus **38*a* is greatly enlarged and has an enlarged upper part with light-valving edges 48*a*, 50*a*** and a lower part which tracks the record groove. Stylus 38*a* functions the same as stylus 38.

Another form of record player is shown in FIGURE 7, to indicate that the physical displacement of the entire turntable is not essential. Turntable 100 in FIGURE 7 is conventional, i.e., mounted for rotation about a fixed axis. To have stylus 38 track the record groove from the outer edge to the inner edge of the record and maintain optical alignment between the stylus and the photosensitive pickup assembly, we use two straight line motion carriage devices 102 and 104 which can be constructed similar to many straight line motion tone arms described in prior patents, for instance in the Rabinow Patent No. 2,915,315. The straight line motion devices 102 and 104 are provided with carriages 106 and 108 just as in the above patent. An arm 110 is mounted on carriage 106 by a gimbal support 111 as the tone arm in Patent No. 2,915,315, while the entire photosensitive system which can be identical to that of FIGURE 1, is mounted on carriage 108. Both carriages move in unison by virtue of the single motor 116 which is drivingly connected by shafts 117 and gear boves 118 to the two screws 103 and 105 of the respective devices 102 and 104. If it is desired to exercise servo control over support arm 110 and the optical system on carriage 108, tracking error servo control signals can be developed and applied to motor 116 in the same manner as in Rabinow Patent No. 2,915,315.

Although the described record players can be used to play monaural records, our record players can be designed to play monaural records only with an accompanying saving of equipment. For instance, stylus 138 (FIGURE 6*a*) is designed to track monaural records, as is stylus 238 (FIGURE 6*b*). They are supported the same as stylus 38, but each has a valving edge (150 and 250) perpendicular to the plane of the record. The image of the stylus, e.g. stylus 250, cooperates with one slot 268 behind which only one photocell is required. For lateral cut records the slot 268 is parallel to the plane of the record (FIGURE 6*b*), and for hill-and-dale records, the slot is perpendicular to the record, and the upper edge of the stylus 250 (or 150) is used for light valving.

It is understood that various other modifications, changes, etc. may be made without departing from the protection of the following claims. For instance, we can use a light trap 126 (FIGURE 8) ahead of lens 62 to exclude spurious light. Also, conventional light pipes 128 (or bundles thereof) can be used between slots 68, 70 and lens 62. The stylus can be made in one piece (FIGURES 3 and 6*a*) or can be made of a reflective part with a jewel or other tracking "needle" attached (FIGURES 6 and 6*b*).

We claim:

1. In a record player for a record having a groove, a stylus, means to support said stylus in a manner to track the groove, and make excursions corresponding to the modulations of the groove; the improvement comprising optical means mounted separately from said support means to view directly said stylus, and means operative with said optical means to provide electrical signals in direct response to the excursions of said stylus and thereby to correspond to said groove modulations, said support means being a tone arm bearing only the stylus so that the moving mass of the tone arm is at a minimum and means for moving said record relative to said arm and said optical means so that the relative position of said arm and said optical means remains substantially constant as the record is being played.

2. The subject mater of claim 1 wherein said signal providing means include a mask having an optical aperture and a photocell on one side of said aperture, said optical means include a lens focussed to form an image of at least a part of said stylus on said mask, and an edge of said stylus image forming a valving edge with respect to said aperture as said stylus tracks the record groove.

3. The subject matter of claim 2 and means including a second photocell, second optical aperture in said mask cooperating with another edge of said image to provide separate signals through said second photocell for stereo record playing.

4. In a record player for stereo records having separate information channels in a single groove, stylus means for tracking both channels of said groove and movable in separate transverse directions in response to the modulations of said separate channels, and optical means to detect the movements of said tracking means in said separate transverse directions and provide separate electrical signals corresponding to the modulations of said separate channels, said optical means including photocells, a mask having a pair of optical apertures at a predetermined transverse angle to each other, means to form an image of said tracking stylus means on said mask, said mask being optically disposed between said image forming means and photocells so that as said tracking stylus means moves in said separate transverse directions said image moves correspondingly to cover and uncover said apertures whereby said photocells are exposed to a greater and lesser degree to said image.

5. A playback system for a stereo record having a groove with separate information channels and wherein the information channels are at a predetermined angle to each other, said system including tracking stylus means for both channels, said tracking stylus means movable in directions substantially parallel to the sides of said angle in tracking said groove so that the movements of said tracking stylus means correspond to the information modulations of said channels, and means in light-flux linkage with said tracking stylus means and responsive to said movements thereof for providing an image of the stylus means movable in accordance with the information modulations of said separate channels, said image providing means including a mask having a first and second optical aperture arranged at an angle corresponding to the angular relation of said information channels, photosensitive means on the opposite side of said mask so that said image covers and uncovers said first aperture without affecting the second in response to tracking stylus means movement derived from one channel and so that said image covers and uncovers the second aperture without affecting the first aperture in response to tracking means movement derived from the other channel.

References Cited

UNITED STATES PATENTS

| | | | |
|---|---|---|---|
| 2,979,573 | 4/1961 | Kuhn | 179—100.41 |
| 3,261,925 | 6/1966 | Smith | 179—100.41 |

FOREIGN PATENTS

| | | |
|---|---|---|
| 288,711 | 4/1928 | Great Britain. |
| 313,904 | 6/1929 | Great Britain. |
| 328,317 | 4/1930 | Great Britain. |

BERNARD KONICK, *Primary Examiner.*

IRVING L. SRAGOW, *Examiner.*

V. P. CANNEY, *Assistant Examiner.*